United States Patent
Chen

(10) Patent No.: US 9,395,752 B2
(45) Date of Patent: Jul. 19, 2016

(54) ELECTROMAGNETIC FIXING MECHANISM FOR PREVENTING TOUCH DISPLAY MODULE FROM PIVOTING RELATIVE TO HOST MODULE AND ELECTRONIC DEVICE THEREWITH

(71) Applicant: Wistron Corporation, New Taipei (TW)

(72) Inventor: Xiaoqing Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 196 days.

(21) Appl. No.: 13/923,361

(22) Filed: Jun. 20, 2013

(65) Prior Publication Data

US 2014/0146484 A1 May 29, 2014

(30) Foreign Application Priority Data

Nov. 23, 2012 (CN) .......................... 2012 1 0484365

(51) Int. Cl.
*H05K 7/00* (2006.01)
*G06F 1/16* (2006.01)

(52) U.S. Cl.
CPC ............ *G06F 1/1616* (2013.01); *G06F 1/1679* (2013.01); *G06F 1/1681* (2013.01); *Y10T 16/5401* (2015.01)

(58) Field of Classification Search
CPC ... G06F 1/1616; G06F 1/1681; G06F 1/1679; Y10T 16/5401
USPC ................................. 361/728–745
See application file for complete search history.

(56) References Cited

U.S. PATENT DOCUMENTS

| 8,943,649 B2 * | 2/2015 | Chen et al. ...................... 16/320 |
| 2009/0144934 A1 * | 6/2009 | Kitagawa et al. ............... 16/320 |
| 2009/0296328 A1 * | 12/2009 | Lin et al. .................. 361/679.02 |
| 2010/0238620 A1 * | 9/2010 | Fish ........................ 361/679.09 |

(Continued)

FOREIGN PATENT DOCUMENTS

TW M340127 9/2008
TW M391012 10/2010

(Continued)

OTHER PUBLICATIONS

Office action mailed on Sep. 19, 2014 for the Taiwan application No. 101146983, filing date: Dec. 12, 2012, p. 1 line 13~14, p. 2~3 and p. 4 line 1~10.

*Primary Examiner* — Bernard Rojas

(74) *Attorney, Agent, or Firm* — Winston Hsu; Scott Margo

(57) ABSTRACT

An electromagnetic fixing mechanism includes a mounted component, a rotating component, a locating module, a fixing module, an electromagnetic component and a control unit. The locating module is for locating the rotating component on at least one fixing position while the rotating component pivots relative to the mounted component. The fixing module is installed on an end of the mounted component and used for fixing the rotating component while the rotating component is located on the at least one fixing position. The electromagnetic component is installed on the mounted component. The control unit is electrically connected to a touch display module and the electromagnetic component. The control unit is used for controlling the electromagnetic component to provide a magnetic attraction force to attract the fixing module for fixing the rotating component while the touch display module is activated.

8 Claims, 15 Drawing Sheets

(56) References Cited

U.S. PATENT DOCUMENTS

2012/0306617 A1 12/2012 Tung
2013/0076059 A1* 3/2013 Zalan et al. ............. 296/97.22
2015/0009614 A1* 1/2015 Tsai ..................... 361/679.27

FOREIGN PATENT DOCUMENTS

| TW | I351911 | 11/2011 |
|---|---|---|
| TW | M415952 | 11/2011 |

* cited by examiner

ELECTROMAGNETIC FIXING MECHANISM FOR PREVENTING TOUCH DISPLAY MODULE FROM PIVOTING RELATIVE TO HOST MODULE AND ELECTRONIC DEVICE THEREWITH

BACKGROUND OF THE INVENTION

1. Field of the Invention

The invention relates to a fixing mechanism and an electronic device therewith and, more particularly, to an electromagnetic fixing mechanism for preventing a touch display module from pivoting relative to a host module by electromagnetic induction and an electronic device therewith.

2. Description of the Prior Art

So far a notebook with touch function is getting more and more popular. Therefore, a user can touch a touch display module immediately to input desired commands. However, since the touch display module of the notebook is pivotally connected to a host module, the touch display module may be shaken while the user touches the touch display module such that the operation feeling may be affected. Furthermore, the pivotal connection between the touch display module and the host module may be damaged easily. Accordingly, how to design a fixing mechanism capable of preventing the touch display module from pivoting relative to the host module automatically while the user performs touch operation is a significant issue for mechanical design.

SUMMARY OF THE INVENTION

The invention provides an electromagnetic fixing mechanism for preventing a touch display module from pivoting relative to a host module by electromagnetic induction and an electronic device therewith, so as to solve the aforesaid problems.

According to the claimed invention, an electromagnetic fixing mechanism for preventing a touch display module of an electronic device from pivoting relative to a host module of the electronic device comprises a mounted component, a rotating component, a locating module, a fixing module, an electromagnetic component and a control unit. The mounted component is connected to the host module. The rotating component is pivotally connected to the mounted component and connected to the touch display module such that the touch display module is capable of pivoting relative to the host module. The locating module is used for locating the rotating component on at least one fixing position while the rotating component pivots relative to the mounted component. The fixing module is installed on an end of the mounted component and used for fixing the rotating component while the rotating component is located on the at least one fixing position. The electromagnetic component is installed on the mounted component and used for providing a magnetic attraction force to attract the fixing module such that the fixing module fixes the rotating component. The control unit is electrically connected to the touch display module and the electromagnetic component. The control unit is used for controlling the electromagnetic component to provide the magnetic attraction force to attract the fixing module while the touch display module is activated.

According to the claimed invention, the locating module comprises a plurality of recesses, a plurality of locating grooves, a plurality of sleeves, a plurality of balls and a plurality of resilient components. The recesses are formed on a side of the locating module. The locating grooves are formed on the rotating component and corresponding to the recesses. The sleeves are installed in the locating grooves, respectively. Each of the balls is disposed at an end of one of the sleeves. The resilient components are installed in the sleeves and used for pushing the balls such that the balls are engaged with the recesses and the rotating component is located on the at least one fixing position.

According to the claimed invention, the fixing module comprises a plurality of fixing holes, a fixing portion, a fixing cover, a fixing pillar and a recovery component. The fixing holes are formed on the rotating component and corresponding to the locating grooves. The fixing portion is fixed on an axle portion of the mounted component, the recesses are formed on a side of the fixing portion and facing the balls, and an insertion hole is formed on the fixing portion. The fixing cover is sleeved and fixed on the axle portion of the mounted component, and a pillar-shaped recess is formed on the fixing cover and corresponding to the insertion hole. The fixing pillar is movably installed in the pillar-shaped recess of the fixing cover. The fixing pillar is driven by the magnetic attraction force provided by the electromagnetic component to pass through the insertion hole and be inserted into one of the fixing holes, so as to prevent the rotating component from pivoting relative to the mounted component. The recovery component is installed in the pillar-shaped recess of the fixing cover and sleeved on the fixing pillar. The recovery component is used for driving the fixing pillar to move into the pillar-shaped recess while the fixing pillar has not been driven by the magnetic attraction force provided by the electromagnetic component yet.

According to the claimed invention, the numbers of the fixing holes, locating grooves, recesses, sleeves, balls and resilient components are identical.

According to the claimed invention, the fixing module comprises a plurality of fixing holes, a fixing portion, a fixing cover, a fixing pillar and a recovery component. The fixing holes are formed on the rotating component. The fixing portion is fixed on an axle portion of the mounted component, and an insertion hole is formed on the fixing portion. The fixing cover is sleeved and fixed on the axle portion of the mounted component, and a pillar-shaped recess is formed on the fixing cover and corresponding to the insertion hole. The fixing pillar is movably installed in the pillar-shaped recess of the fixing cover. The fixing pillar is driven by the magnetic attraction force provided by the electromagnetic component to pass through the insertion hole and be inserted into one of the fixing holes, so as to prevent the rotating component from pivoting relative to the mounted component. The recovery component is installed in the pillar-shaped recess of the fixing cover and sleeved on the fixing pillar. The recovery component is used for driving the fixing pillar to move into the pillar-shaped recess while the fixing pillar has not been driven by the magnetic attraction force provided by the electromagnetic component yet.

According to the claimed invention, the locating module comprises a plurality of recesses, a plurality of locating grooves, a plurality of sleeves, a plurality of balls and a plurality of resilient components. The recesses are formed on a side of the fixing portion. The locating grooves are formed on the rotating component and corresponding to the recesses. The sleeves are installed in the locating grooves, respectively. Each of the balls is disposed at an end of one of the sleeves. The resilient components are installed in the sleeves and used for pushing the balls such that the balls are engaged with the recesses and the rotating component is located on the at least one fixing position.

According to the claimed invention, the locating module comprises a base, a plurality of recesses, a ball and a resilient component. The base is connected to the mounted component and has a sleeve formed thereon. The recesses are formed on the rotating component. The ball is installed in the sleeve of the base. The resilient component is used for pushing the ball such that the ball is engaged with one of the recesses and the rotating component is located on the at least one fixing position.

According to the claimed invention, the fixing module comprises a plurality of fixing holes, a fixing cover, a fixing pillar and a recovery component. The fixing holes are formed on the rotating component. The fixing cover is sleeved and fixed on an axle portion of the mounted component, and a pillar-shaped recess is formed on the fixing cover. The fixing pillar is movably installed in the pillar-shaped recess of the fixing cover. The fixing pillar is driven by the magnetic attraction force provided by the electromagnetic component to be inserted into one of the fixing holes, so as to prevent the rotating component from pivoting relative to the mounted component. The recovery component is installed in the pillar-shaped recess of the fixing cover and sleeved on the fixing pillar. The recovery component is used for driving the fixing pillar to move into the pillar-shaped recess while the fixing pillar has not been driven by the magnetic attraction force provided by the electromagnetic component yet.

According to the claimed invention, the numbers of the recesses and fixing holes are identical.

According to the claimed invention, the locating module comprises a base, a plurality of engaging portions, an engaging component and two resilient components. The base is connected to the mounted component. The engaging portions are formed on the rotating component. The engaging component is installed in the base and used for engaging with one of the engaging portions such that the rotating component is located on the at least one fixing position. The two resilient components are connected to opposite sides of the engaging component and used for driving the engaging component to move to an initial position while the engaging component is disengaged from one of the engaging portions.

According to the claimed invention, the fixing module comprises a plurality of fixing holes, a fixing cover, a fixing pillar and a recovery component. The fixing holes are formed on the rotating component. The fixing cover is sleeved and fixed on an axle portion of the mounted component, and a pillar-shaped recess is formed on the fixing cover. The fixing pillar is movably installed in the pillar-shaped recess of the fixing cover. The fixing pillar is driven by the magnetic attraction force provided by the electromagnetic component to be inserted into one of the fixing holes, so as to prevent the rotating component from pivoting relative to the mounted component. The recovery component is installed in the pillar-shaped recess of the fixing cover and sleeved on the fixing pillar. The recovery component is used for driving the fixing pillar to move into the pillar-shaped recess while the fixing pillar has not been driven by the magnetic attraction force provided by the electromagnetic component yet.

According to the claimed invention, the numbers of the engaging portions and fixing holes are identical.

According to the claimed invention, an electronic device comprises a host module, a touch display module and an electromagnetic fixing mechanism for preventing the touch display module from pivoting relative to the host module. The touch display module is pivotally connected to the host module. The electromagnetic fixing mechanism comprises a mounted component, a rotating component, a locating module, a fixing module, an electromagnetic component and a control unit. The mounted component is connected to the host module. The rotating component is pivotally connected to the mounted component and connected to the touch display module such that the touch display module is capable of pivoting relative to the host module. The locating module is used for locating the rotating component on at least one fixing position while the rotating component pivots relative to the mounted component. The fixing module is installed on an end of the mounted component and used for fixing the rotating component while the rotating component is located on the at least one fixing position. The electromagnetic component is installed on the mounted component and used for providing a magnetic attraction force to attract the fixing module such that the fixing module fixes the rotating component. The control unit is electrically connected to the touch display module and the electromagnetic component. The control unit is used for controlling the electromagnetic component to provide the magnetic attraction force to attract the fixing module while the touch display module is activated.

The electromagnetic fixing mechanism of the invention utilizes the locating module to locate the rotating component, which is connected to the touch display module, on the desired fixing position and utilizes the control unit to control the electromagnetic component to provide the magnetic attraction force to attract the fixing module while the touch display module is activated, such that the fixing module fixes the rotating module, so as to prevent the touch display module from pivoting relative to the host module. Accordingly, compared with the prior art, when a user performs touch operation on the touch display module of the invention, the touch display module will not pivot and shake relative to the host module such that the user will feel more comfortable than the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
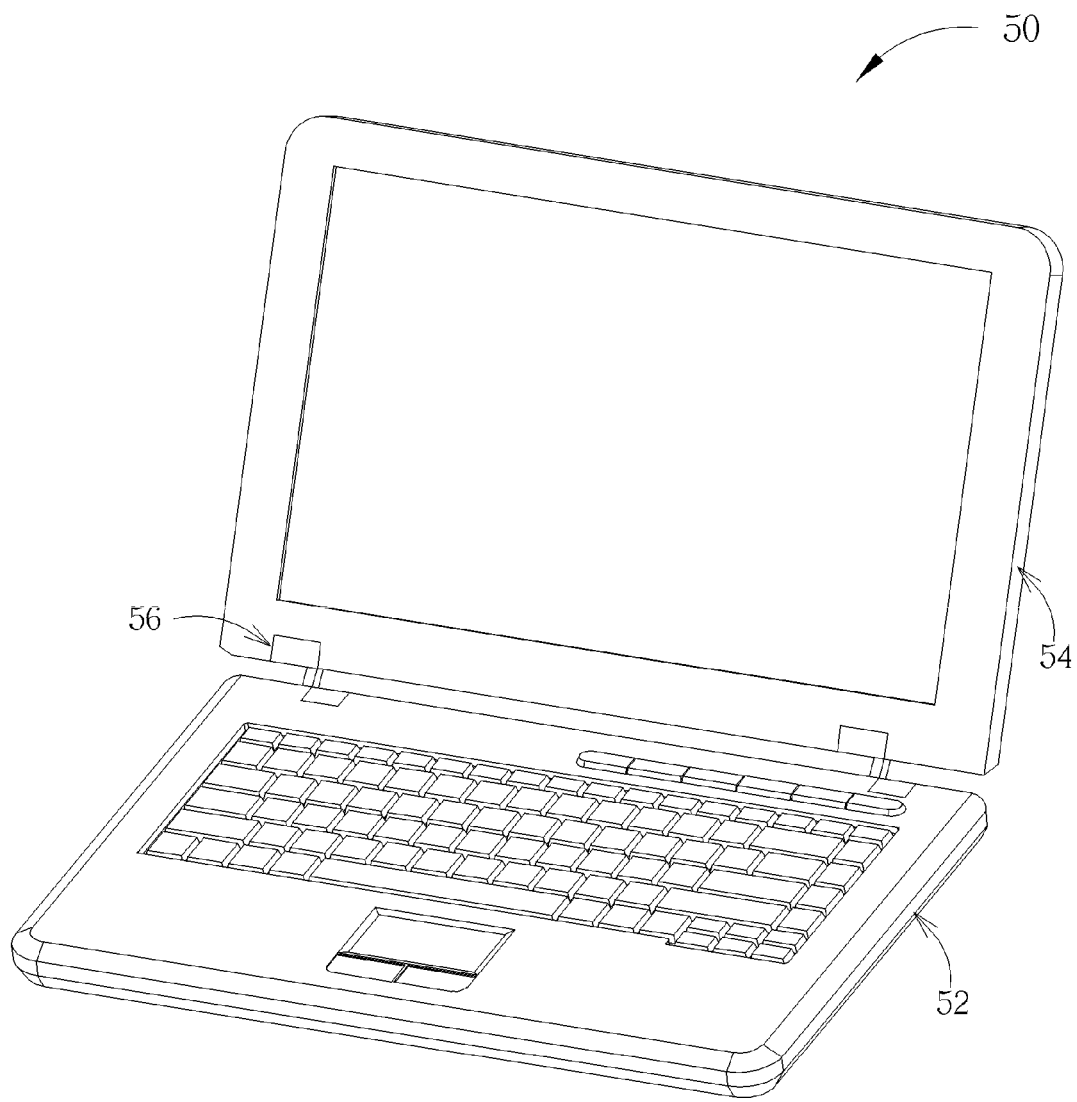
FIG. 1 is a perspective view illustrating an electronic device according to an embodiment of the invention.
Figure 3:
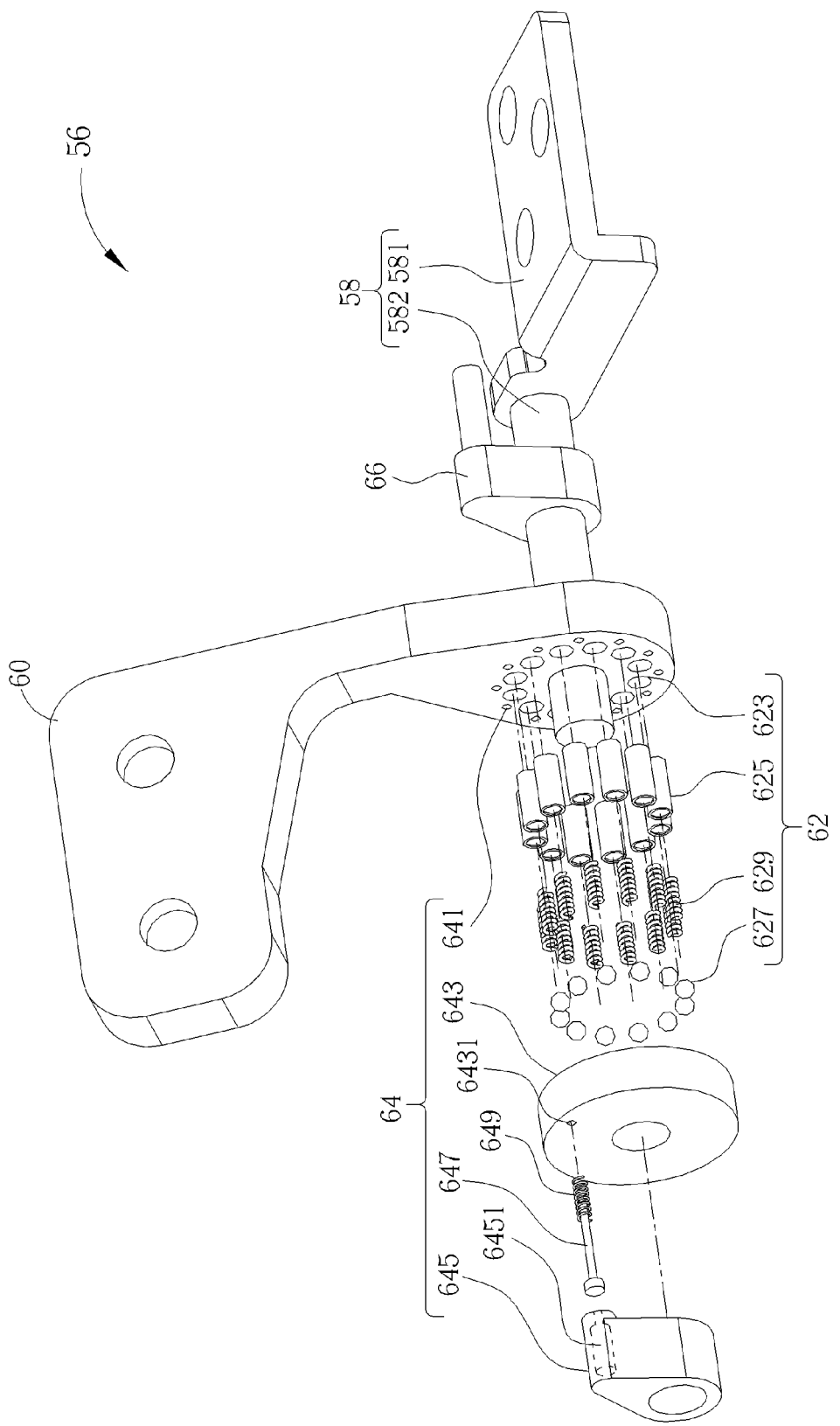
FIG. 3 is an exploded view illustrating an electromagnetic fixing mechanism according to the embodiment of the invention.
Figure 4:
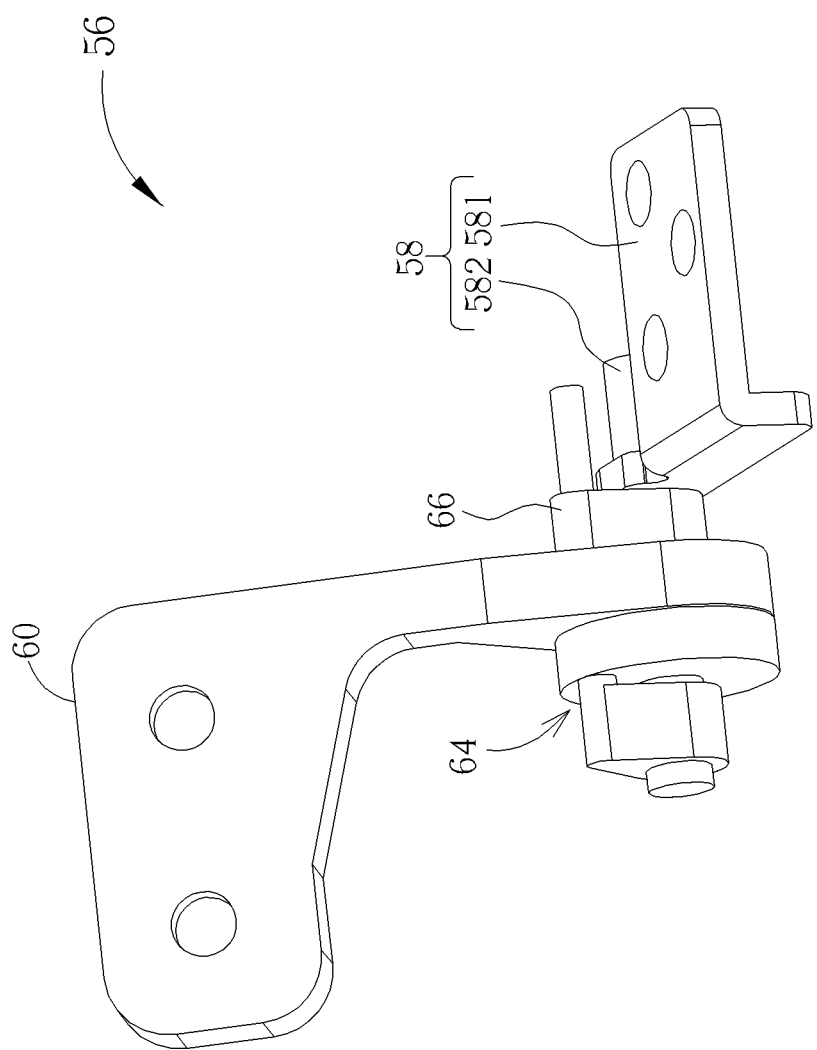
FIG. 4 is an assembly view illustrating the electromagnetic fixing mechanism according to the embodiment of the invention.
Figure 5:
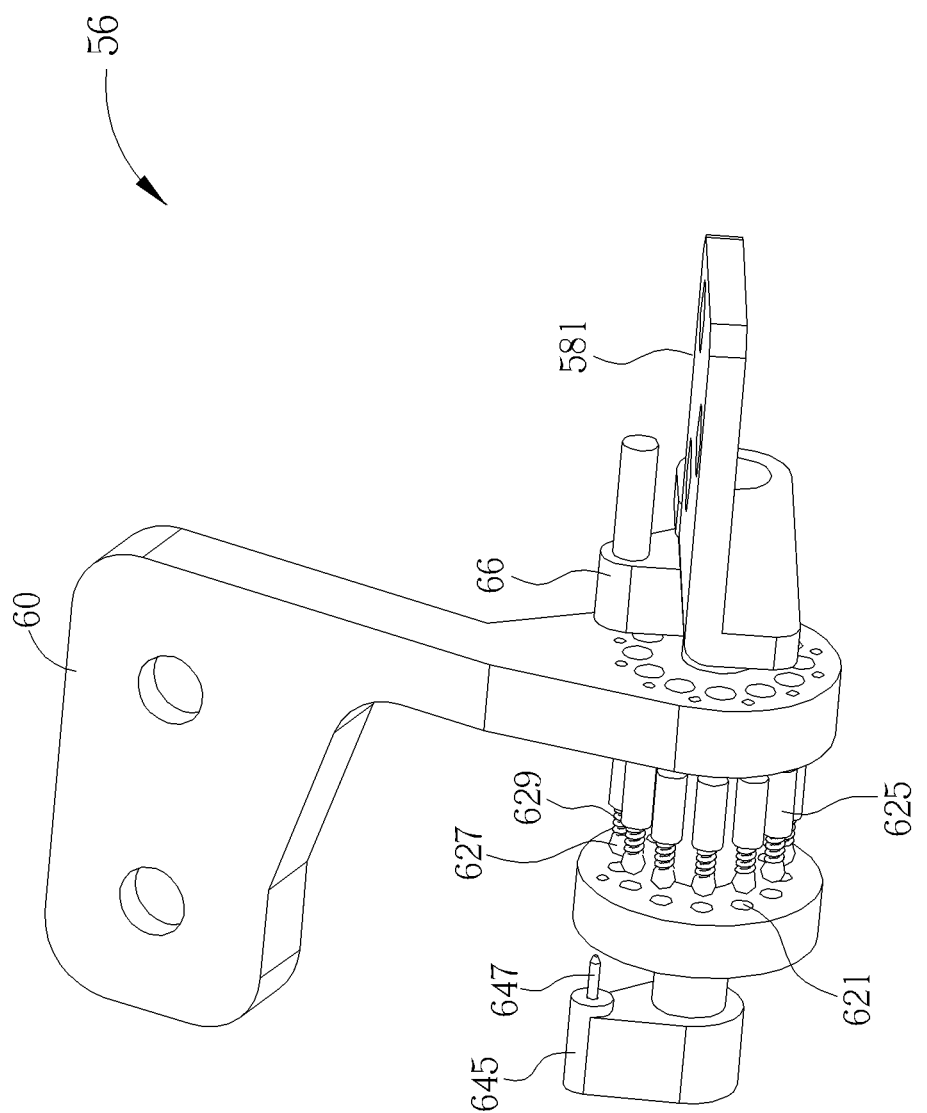
FIG. 5 is a schematic diagram illustrating the electromagnetic fixing mechanism from another viewing angle according to the embodiment of the invention.

Referring to FIG. 1, FIG. 1 is a perspective view illustrating an electronic device 50 according to an embodiment of the invention. The electronic device 50 of the invention comprises a host module 52, a touch display module 54 and an electromagnetic fixing mechanism 56. The electronic device 50 may be a notebook with touch function such that a user can perform touch operation on the touch display module 54 immediately to input desired commands. Referring to FIGS. 2 to 5, FIG. 2 is a functional block diagram illustrating the electronic device 50 according to the embodiment of the invention, FIG. 3 is an exploded view illustrating an electromagnetic fixing mechanism 56 according to the embodiment of the invention, FIG. 4 is an assembly view illustrating the electromagnetic fixing mechanism 56 according to the embodiment of the invention, and FIG. 5 is a schematic diagram illustrating the electromagnetic fixing mechanism 56 from another viewing angle according to the embodiment of the invention. The electromagnetic fixing mechanism 56 is used for preventing the touch display module 54 from pivoting relative to the host module 52. The electromagnetic fixing mechanism 56 comprises a mounted component 58, a rotating component 60, a locating module 62, a fixing module 64, an electromagnetic component 66 and a control unit 68. The mounted component 58 is connected to the host module 52. The rotating component 60 is pivotally connected to the mounted component 58 and connected to the touch display module 54 such that the touch display module 54 is capable of pivoting relative to the host module 52. The locating module 62 is used for locating the rotating component 60 on at least one fixing position while the rotating component 60 pivots relative to the mounted component 58. The fixing module 64 is installed on an end of the mounted component 58 and used for fixing the rotating component 60 while the rotating component 60 is located on the at least one fixing position. The electromagnetic component 66 is installed on the mounted component 58 and used for providing a magnetic attraction force to attract the fixing module 64 such that the fixing module 64 fixes the rotating component 60. The control unit 68 is electrically connected to the touch display module 54 and the electromagnetic component 66. The control unit 68 is used for controlling the electromagnetic component 66 to provide the magnetic attraction force to attract the fixing module 64 while the touch display module 54 is activated.

As shown in FIG. 3, the mounted component 58 comprises a mounted portion 581 and an axle portion 582, wherein the mounted portion 581 is mounted on the host module 52, the axle portion 582 passes through the electromagnetic component 66 and the rotating component 60, and the rotating component 60 is capable of pivoting on the axle portion 582. Since the rotating component 60 is fixed on the touch display module 54, the touch display module 54 can pivot relative to the host module 52. The locating module 62 comprises a plurality of recesses 621, a plurality of locating grooves 623, a plurality of sleeves 625, a plurality of balls 627 and a plurality of resilient components 629. The fixing module 64 comprises a plurality of fixing holes 641, a fixing portion 643, a fixing cover 645, a fixing pillar 647 and a recovery component 649. The recesses 621 are formed on a side of the fixing portion 643 of the locating module 64. The locating grooves 623 are formed on the rotating component 60 and corresponding to the recesses 621. The sleeves 625 are installed in the locating grooves 623, respectively. Each of the balls 627 is disposed at an end of one of the sleeves 625. The resilient components 629 are installed in the sleeves 625 and used for pushing the balls 627 such that the balls 627 are engaged with the recesses 621, so as to provide a torque for the rotating component 60 to pivot relative to the mounted component 58. In other words, the engagement between the balls 627 and the recesses 621 may be a torque source such that the touch display device module 54 will not be easy to shake while a user perform touch operation thereon, so as to prevent the user from feeling uncomfortable.

Furthermore, the fixing holes 641 are formed on the rotating component 60 and corresponding to the locating grooves 623. In this embodiment, each of the fixing holes 641 is disposed outside a position between two adjacent locating grooves 623. The fixing portion 643 is fixed on an axle portion 582 of the mounted component 58, and an insertion hole 6431 is formed on the fixing portion 643. The fixing cover 645 is sleeved and fixed on the axle portion 582 of the mounted component 58, and a pillar-shaped recess 6451 is formed on the fixing cover 645 and corresponding to the insertion hole 6431 of the fixing portion 643. The fixing pillar 647 is movably installed in the pillar-shaped recess 6451 of the fixing cover 645. The fixing pillar 647 may be made of magnetic material, such as metal material with magnetism. The fixing pillar 647 can be driven by the magnetic attraction force provided by the electromagnetic component 66 to pass through the insertion hole 6431 and be inserted into one of the fixing holes 641, so as to prevent the rotating component 60 from pivoting relative to the mounted component 58. The recovery component 649 is installed in the pillar-shaped recess 6451 of the fixing cover 645 and sleeved on the fixing pillar 647. The recovery component 649 is used for driving the fixing pillar 647 to move to an initial position inside the pillar-shaped recess 6451 while the fixing pillar 647 has not been driven by the magnetic attraction force provided by the electromagnetic component 66 yet. It should be noted that the numbers of the fixing holes 641, locating grooves 623, recesses 621, sleeves 625, balls 627 and resilient components 629 are identical, not limited to this embodiment, and can be determined based on practical applications.

Referring to FIG. 1 at the same time, when the user wants to open or close the electronic device 50, he/she can rotate the touch display module 54 such that the touch display module 54 pivots on the axle portion 582 relative to the host module 52. When the user wants to rotate the touch display module 54, he/she has to push the touch display module 54 to move the rotating component 60, so as to overcome the torque generated by the engagement between the balls 627 and the recesses 621. When the rotating component 60 is rotating due to an external force, the balls 627, which are engaged with the recesses 621, will be pushed by the recesses 621 to move toward the rotating component 60 and compress the resilient components 629 installed in the sleeves 625. After the balls 627 are disengaged from the recesses 621, the rotating component 60 can pivot on the axle portion 582 accordingly. When the rotating component 60 rotates with a desired angle, the balls 627 are aligned with the recesses 621 again and the compressed resilient components 629 generate elastic recovery force such that the balls 627 are engaged with the recesses

621 again. Consequently, the touch display module 54 is located at a desired viewing angle relative to the host module 52.

Figure 2:
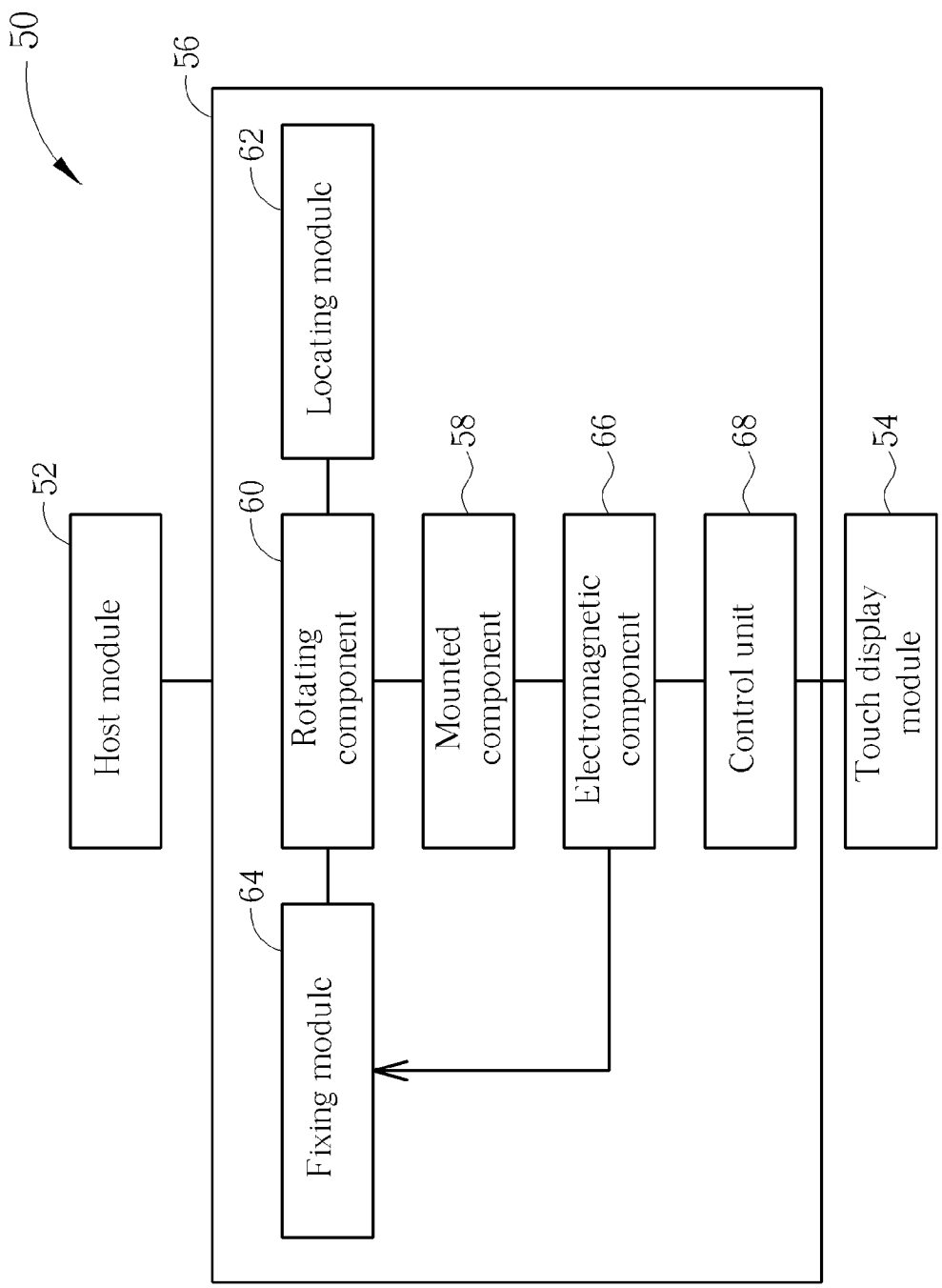
FIG. 2 is a functional block diagram illustrating the electronic device according to the embodiment of the invention.
Figure 6:
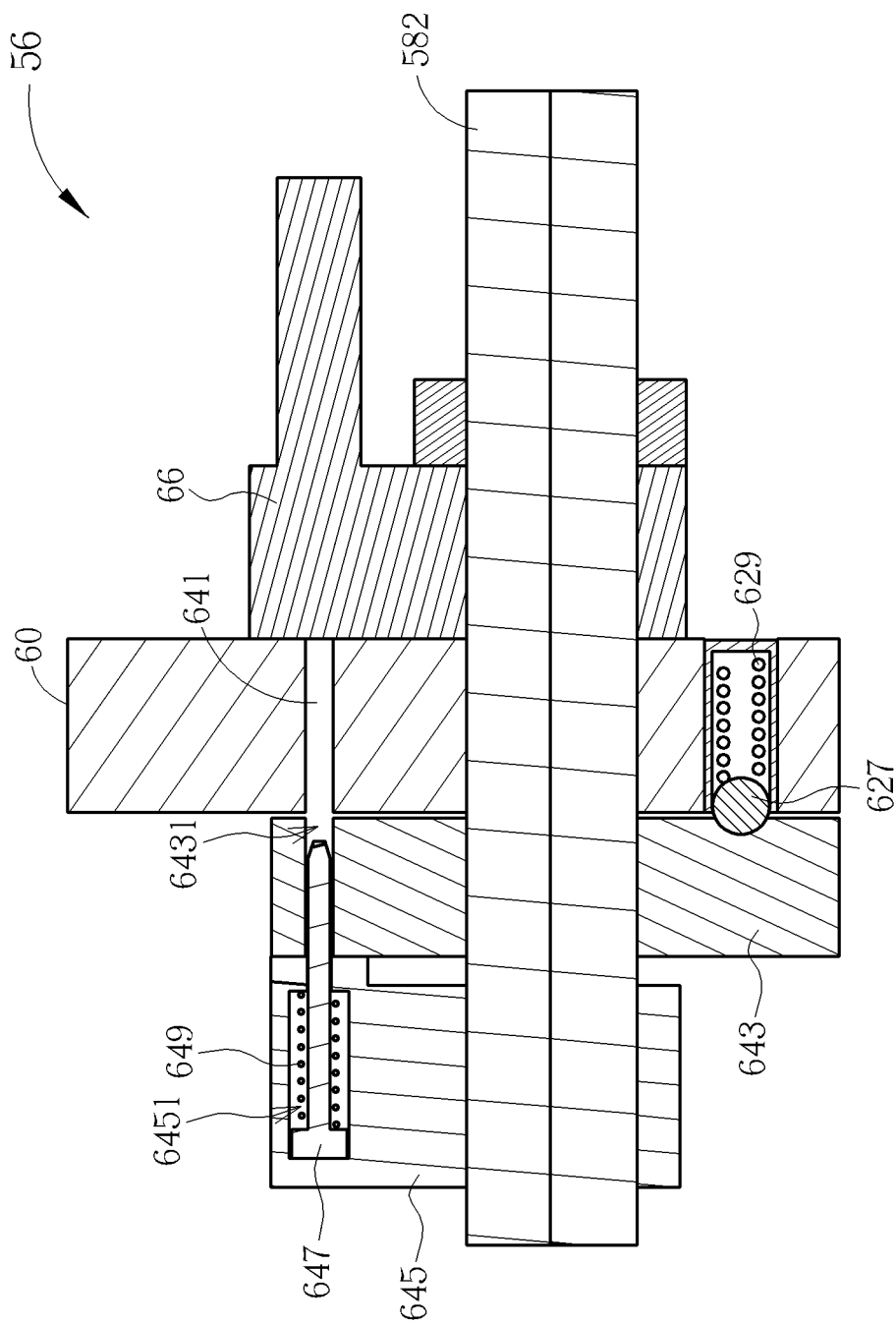
FIG. 6 is a cross-sectional view illustrating parts of the electromagnetic fixing mechanism according to the embodiment of the invention.
Figure 7:
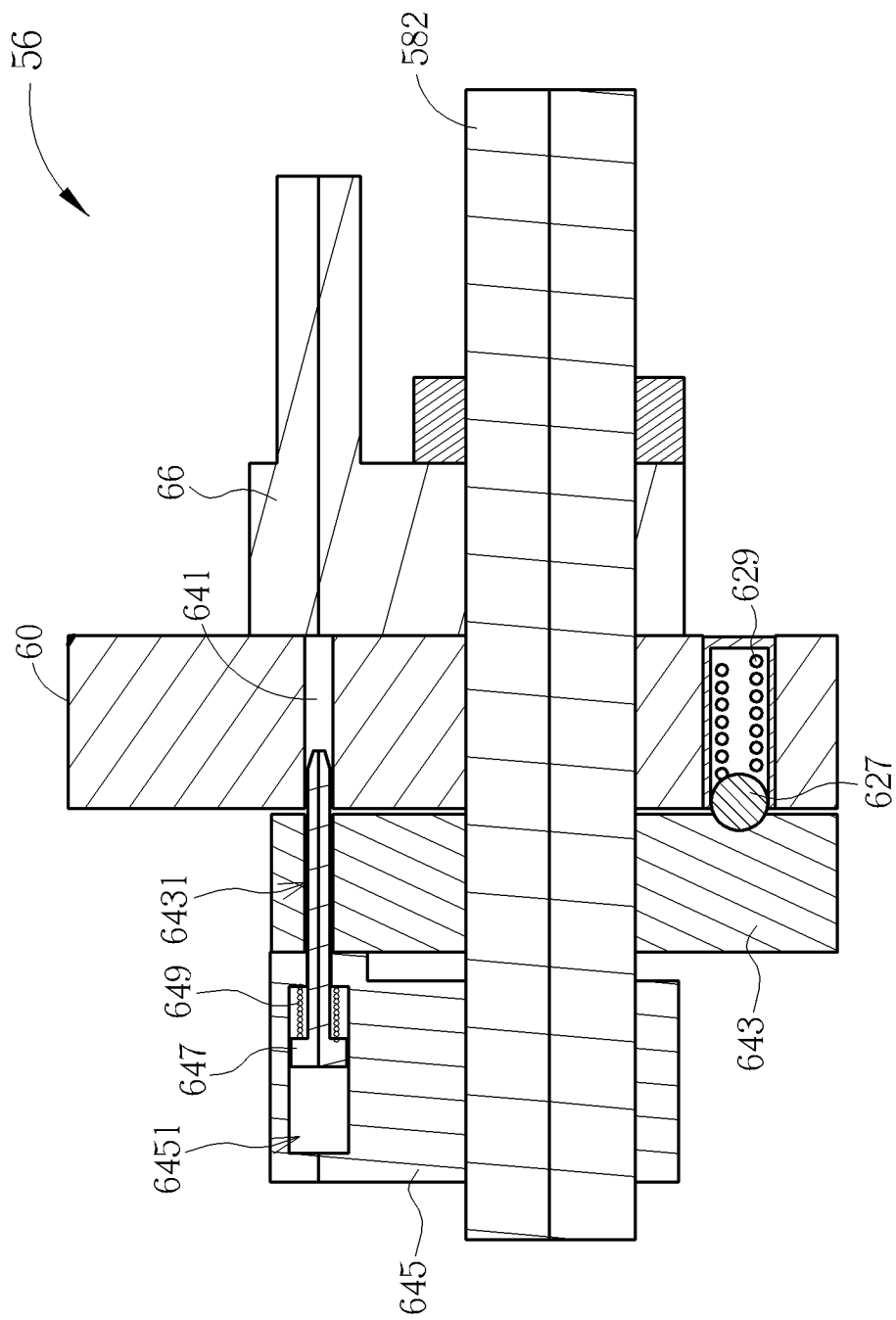
FIG. 7 is a cross-sectional view illustrating the fixing pillar being inserted into the insertion hole and the fixing hole according to the embodiment of the invention.
Figure 8:
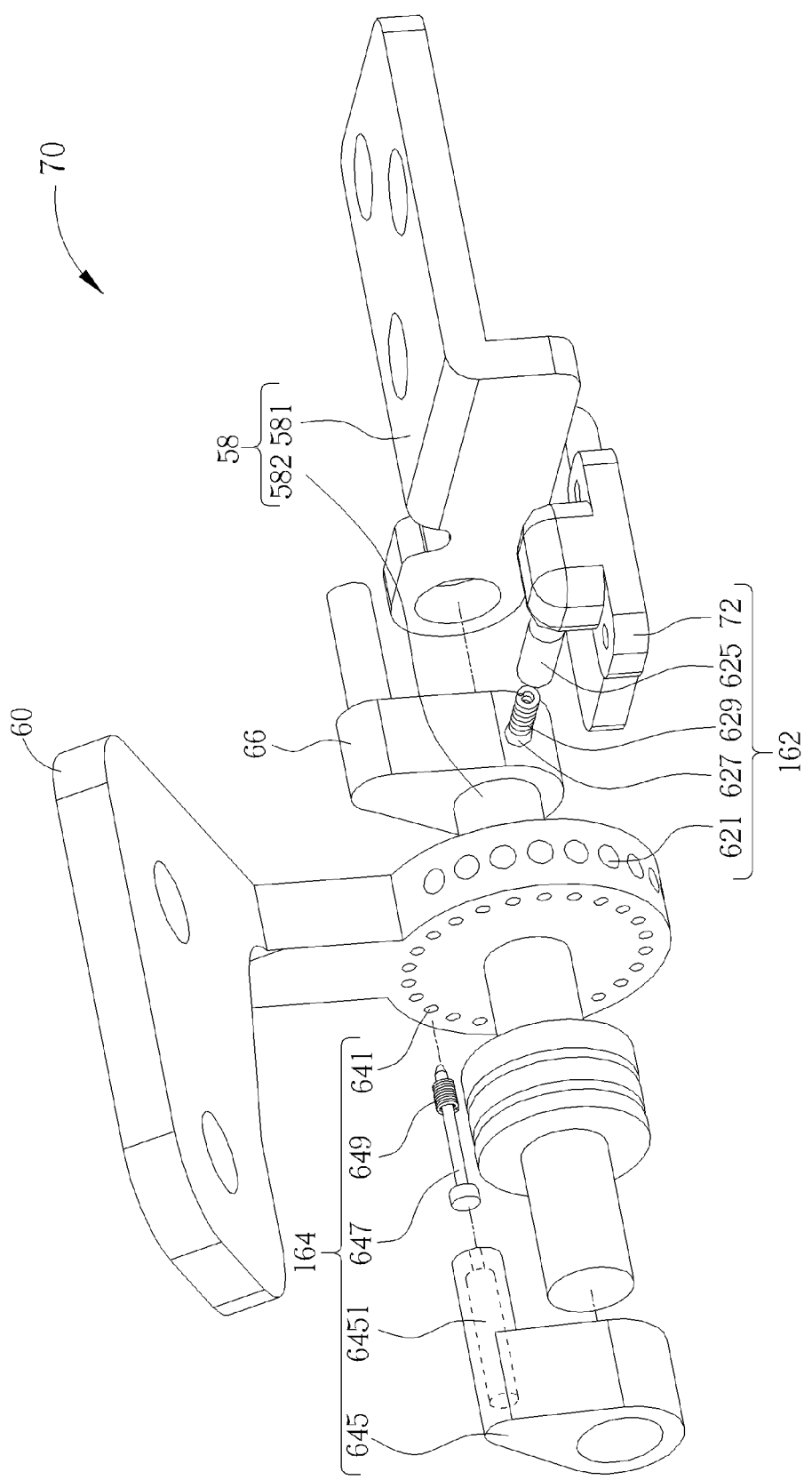
FIG. 8 is an exploded view illustrating an electromagnetic fixing mechanism according to another embodiment of the invention.

Referring to FIGS. 2, 6 and 7, FIG. 6 is a cross-sectional view illustrating parts of the electromagnetic fixing mechanism 56 according to the embodiment of the invention, and FIG. 7 is a cross-sectional view illustrating the fixing pillar 647 being inserted into the insertion hole 6431 and the fixing hole 641 according to the embodiment of the invention. When the user performs touch operation on the touch display module 54, the control unit 68 will detect that the user activate the touch display module 54 and then transmit signals to the electromagnetic component 66, so as to trigger the electromagnetic component 66 to generate a magnetic attraction force. At this time, the fixing pillar 647 is attracted by the magnetic attraction force and then moves toward the electromagnetic component 66. Accordingly, the fixing pillar 647 will move from a position shown in FIG. 6 to another position shown in FIG. 7. As shown in FIG. 7, the fixing pillar 647 is inserted into the insertion hole 6431 and the fixing hole 641. Since the fixing cover 645 are fixed with the fixing portion 643 and does not pivot on the axle portion 582, the rotating component 60 is restrained by the fixing pillar 647 and located on a fixing position when the fixing pillar 647 is inserted into the insertion hole 6431 and the fixing hole 641. At this time, the touch display module 54 cannot pivot relative to the host module 52. In other words, when the user performs touch operation, the touch display module 54 will be kept at the fixing position stably without shaking so that the user will not feel uncomfortable during touch operation. When the finger of the user gets away from the touch display module 54, the control unit 68 will stop transmitting signals to the electromagnetic component 66 such that the electromagnetic component 66 cannot provide the magnetic attraction force for the fixing pillar 647 anymore. Consequently, the fixing pillar 647 is pushed by the elastic recovery force of the recovery component 649 and then moves back to the position shown in FIG. 6. Then, the touch display module 54 can pivot relative to the host module 52. Furthermore, the invention may be also implemented in the following manner. When the control unit 68 detects that the user activates the touch display module 54, the control unit 68 stops transmitting signals to the electromagnetic component 66 so as to trigger the electromagnetic component 66 to generate the magnetic attraction force; and when the finger of the user gets away from the touch display module 54, the control unit 68 transmits signals to the electromagnetic component 66 such that the electromagnetic component 66 stops providing the magnetic attraction force for the fixing pillar 647. The operation principle is the same as the aforesaid embodiment and will not be depicted herein again. As mentioned in the above, as long as the electromagnetic component 66 can be triggered to generate the magnetic attraction force while the touch display module 54 is activated, the scope of the invention can be achieved accordingly.

Figure 9:
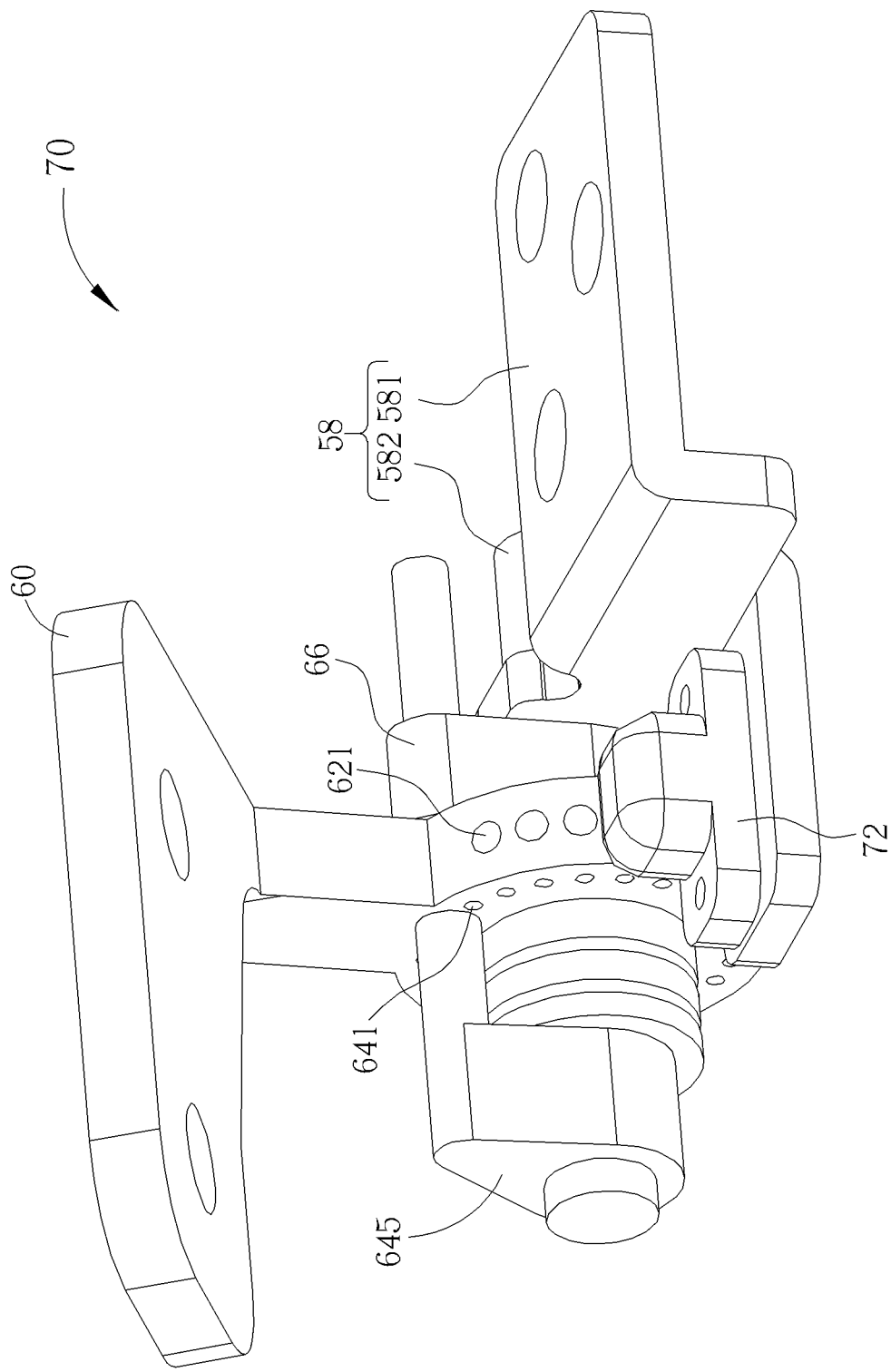
FIG. 9 is an assembly view illustrating the electromagnetic fixing mechanism according to another embodiment of the invention.
Figure 10:
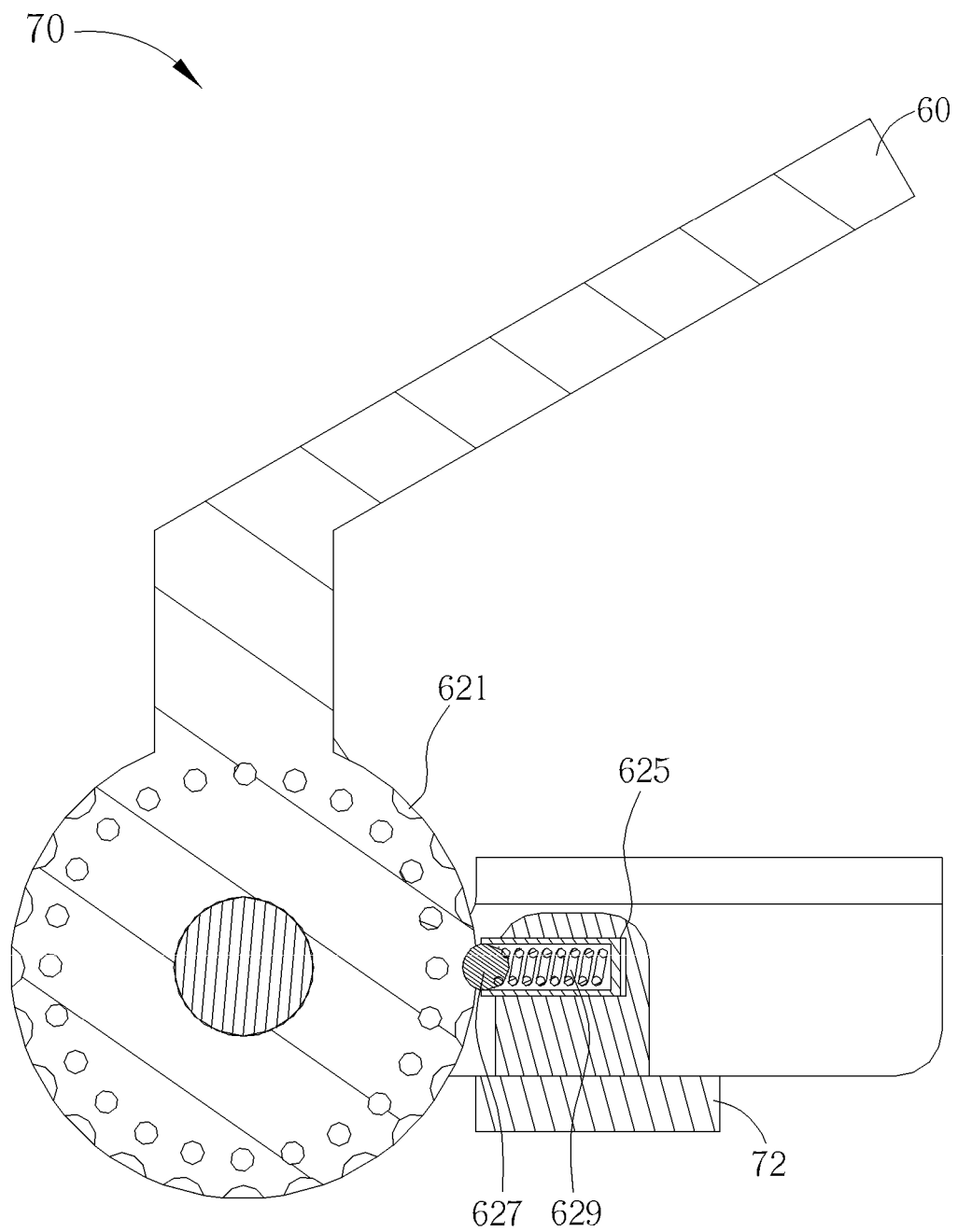
FIGS. 10 and 11 are cross-sectional views illustrating different parts of the electromagnetic fixing mechanism according to another embodiment of the invention.
Figure 11:
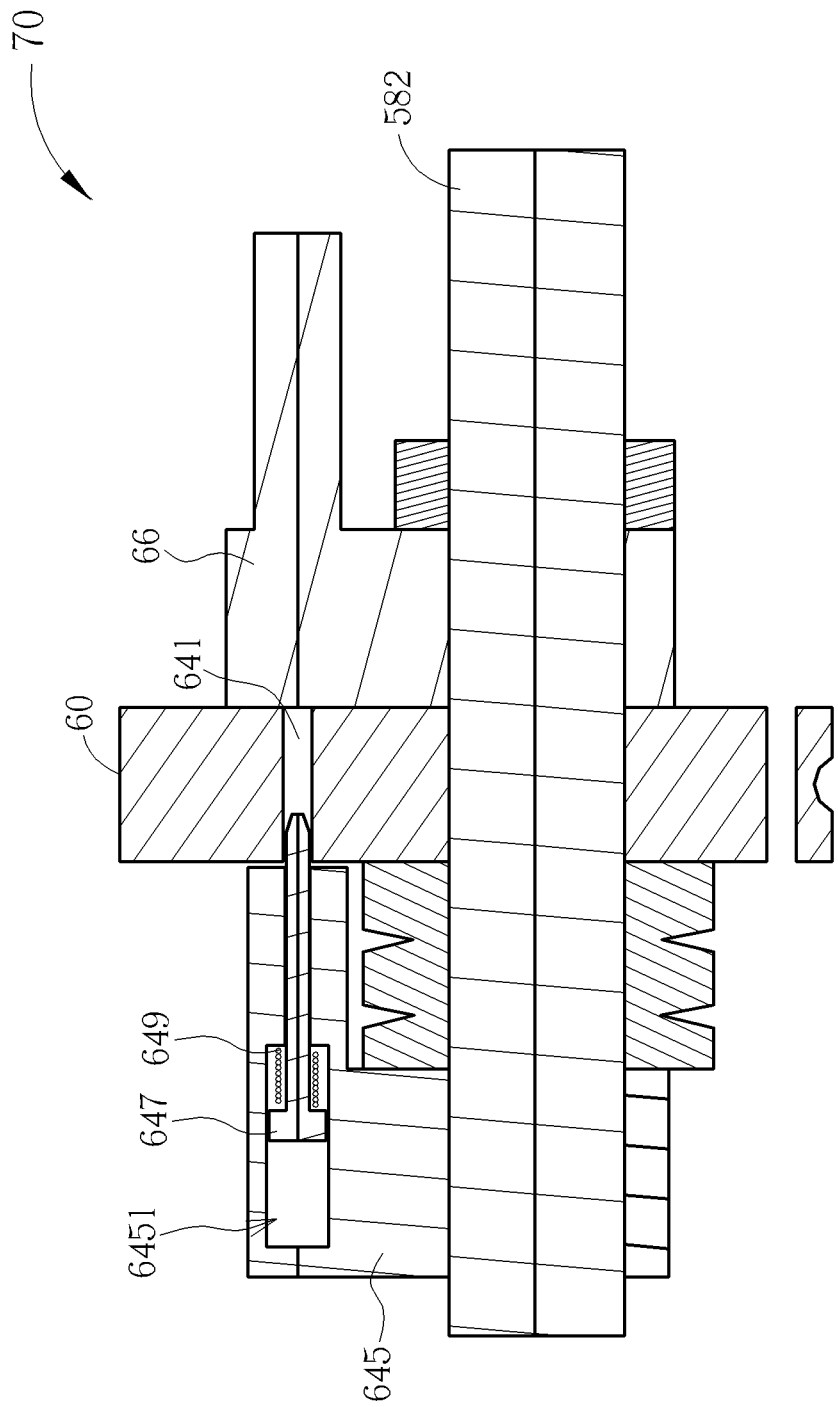
Figure 12:
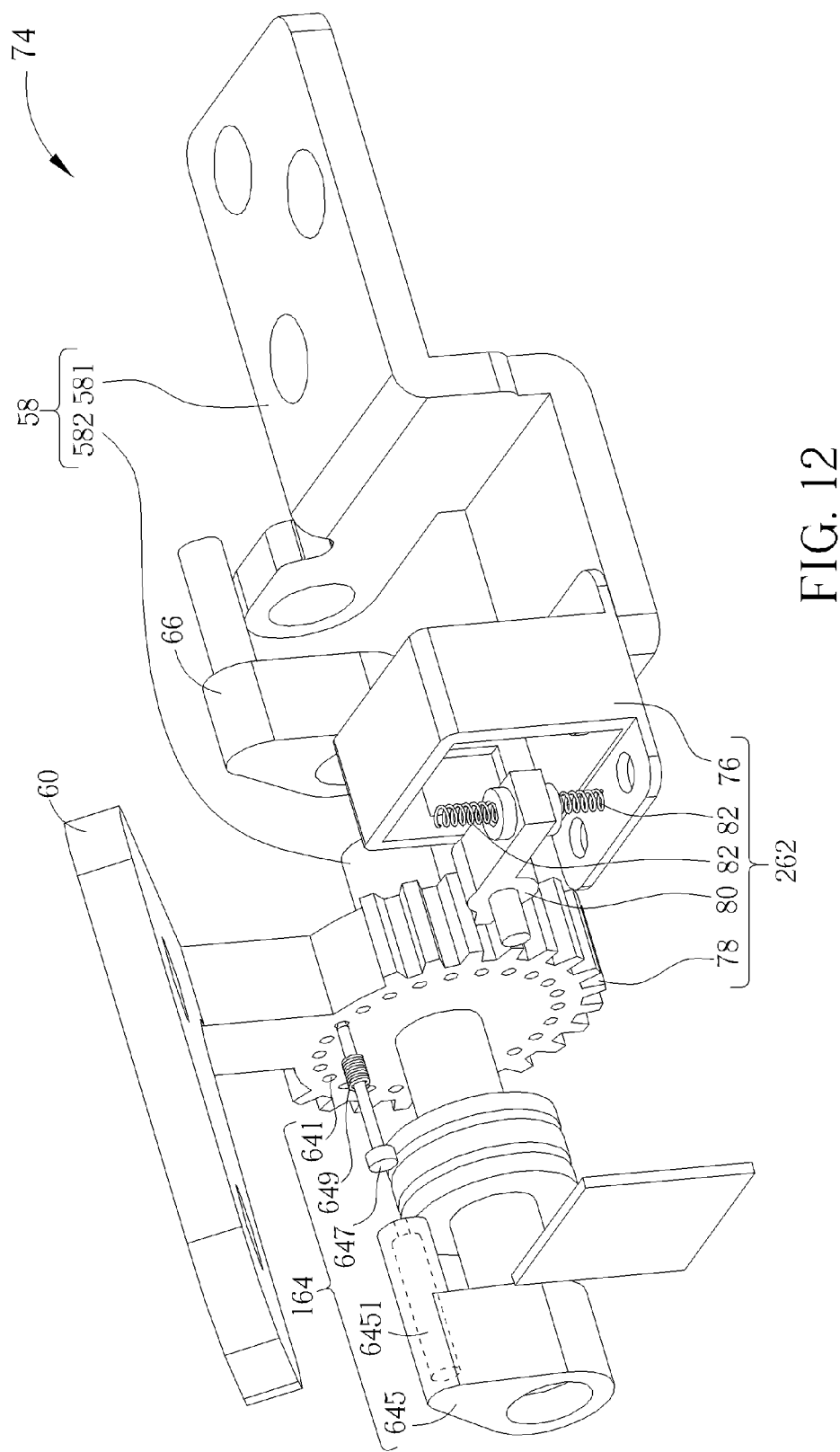
FIG. 12 is an exploded view illustrating an electromagnetic fixing mechanism according to another embodiment of the invention.

Referring to FIGS. 2 and 8-11, FIG. 8 is an exploded view illustrating an electromagnetic fixing mechanism 70 according to another embodiment of the invention, FIG. 9 is an assembly view illustrating the electromagnetic fixing mechanism 70 according to another embodiment of the invention, and FIGS. 10 and 11 are cross-sectional views illustrating different parts of the electromagnetic fixing mechanism 70 according to another embodiment of the invention. The difference between this embodiment and the aforesaid embodiment is that the locating module 162 and the fixing module 164 are implemented by different manners. In this embodiment, the locating module 162 comprises a base 72, a plurality of recesses 621, a ball 627 and a resilient component 629. The base 72 is connected to the mounted portion 581 of the mounted component 58 and has a sleeve 625 formed thereon, wherein the sleeve 625 is used for accommodating the ball 627 and the resilient component 629. The resilient component 629 is used for pushing the ball 627 such that the ball 627 is engaged with one of the recesses 621 and the rotating component 60 is located on at least one fixing position. When the rotating component 60 is rotating due to an external force, the ball 627, which is engaged with one of the recesses 621, will be pushed by the recess 621 to move toward the base 72 and compress the resilient component 629 installed in the sleeve 625. After the ball 627 is disengaged from the recess 621, the rotating component 60 can pivot on the axle portion 582 accordingly. When the rotating component 60 rotates with a desired angle, the ball 627 is aligned with another recess 621 again and the compressed resilient component 629 generates an elastic recovery force such that the ball 627 is pushed by the resilient component 629 and then engaged with another recess 621 again, so as to locate the rotating component 60 on the fixing position correspondingly. As to the fixing module 64, only the fixing portion 643 is removed. The other components are the same as those mentioned in the aforesaid embodiment so the related explanation will not be depicted herein again. Also, the numbers of the recesses 621 and fixing holes 641 are identical.

Referring to FIGS. 2 and 11, as mentioned in the aforesaid embodiment, when the user performs touch operation on the touch display module 54, the control unit 68 will detect that the user activates the touch display module 54 and then transmit signals to the electromagnetic component 66, so as to trigger the electromagnetic component 66 to generate the magnetic attraction force. At this time, the fixing pillar 647 is attracted by the magnetic attraction force and then moves toward the electromagnetic component 66. Accordingly, the fixing pillar 647 is inserted into the fixing hole 641 of the rotating component 60 such that the rotating component 60 is restrained by the fixing pillar 647 and located on a fixing position. When the finger of the user gets away from the touch display module 54, the control unit 68 will stop transmitting signals to the electromagnetic component 66 such that the electromagnetic component 66 cannot provide the magnetic attraction force for the fixing pillar 647 anymore. Consequently, the fixing pillar 647 is pushed by the elastic recovery force of the recovery component 649 and then moves back to the position before being attracted by the magnetic attraction force. Then, the touch display module 54 can pivot relative to the host module 52. As mentioned in the aforesaid embodiment, the invention may be also implemented in the following manner. When the control unit 68 detects that the user activates the touch display module 54, the control unit 68 stops transmitting signals to the electromagnetic component 66 so as to trigger the electromagnetic component 66 to generate the magnetic attraction force; and when the finger of the user gets away from the touch display module 54, the control unit 68 transmits signals to the electromagnetic component 66 such that the electromagnetic component 66 stops providing the magnetic attraction force for the fixing pillar 647. The operation principle is the same as the aforesaid embodiment and will not be depicted herein again.

Figure 13:
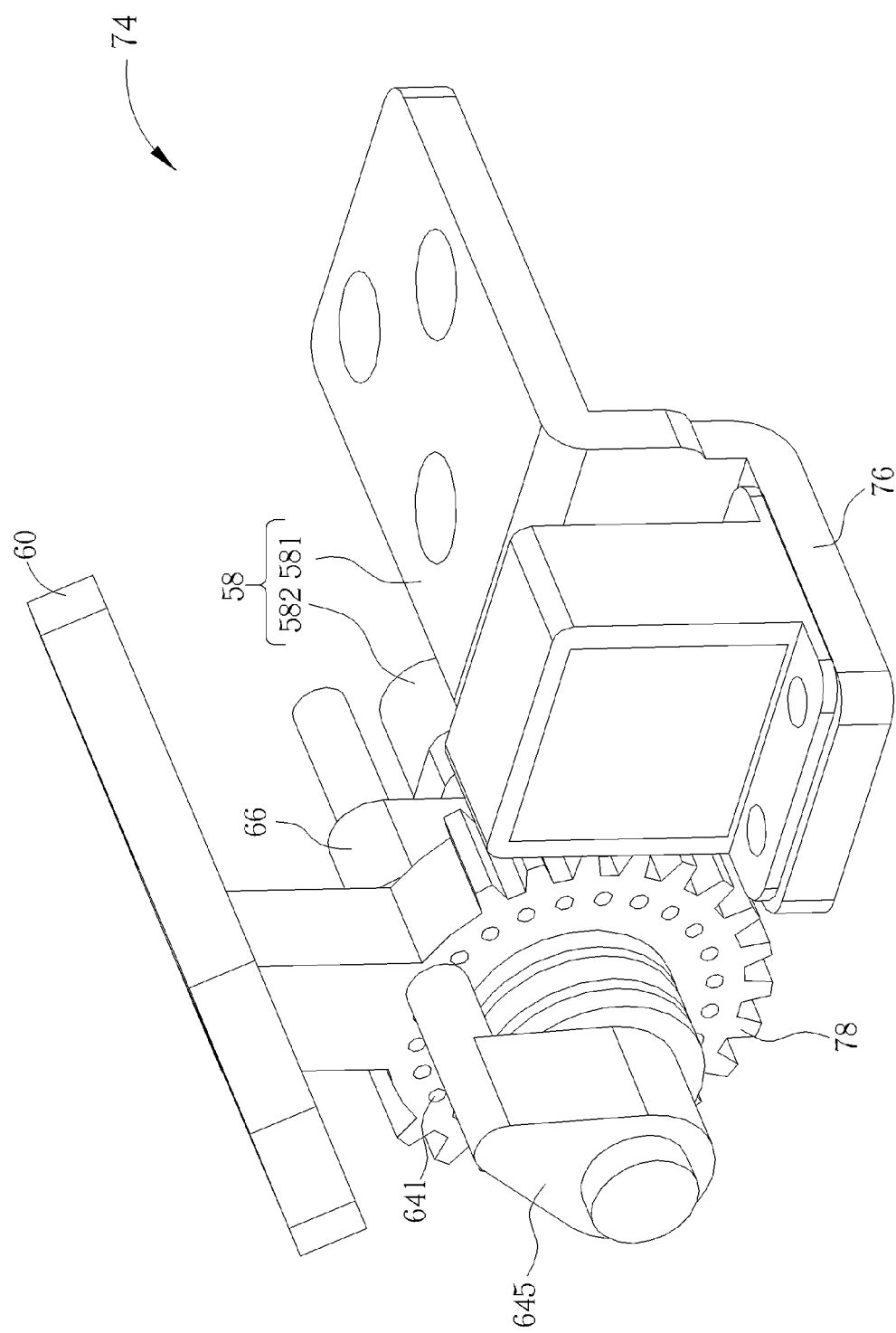
FIG. 13 is an assembly view illustrating the electromagnetic fixing mechanism according to another embodiment of the invention.
Figure 14:
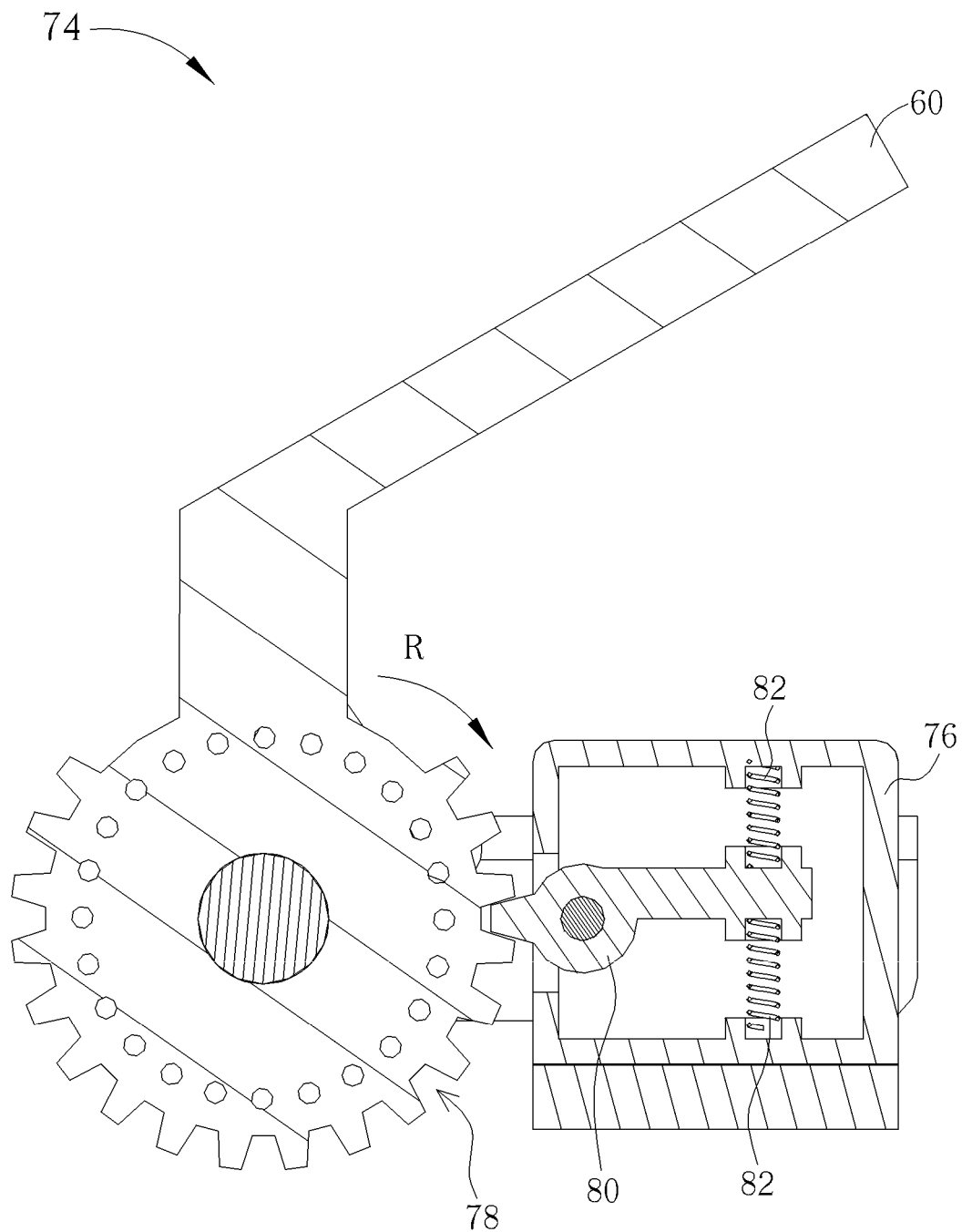
FIGS. 14 and 15 are cross-sectional views illustrating different parts of the electromagnetic fixing mechanism according to another embodiment of the invention.
Figure 15:
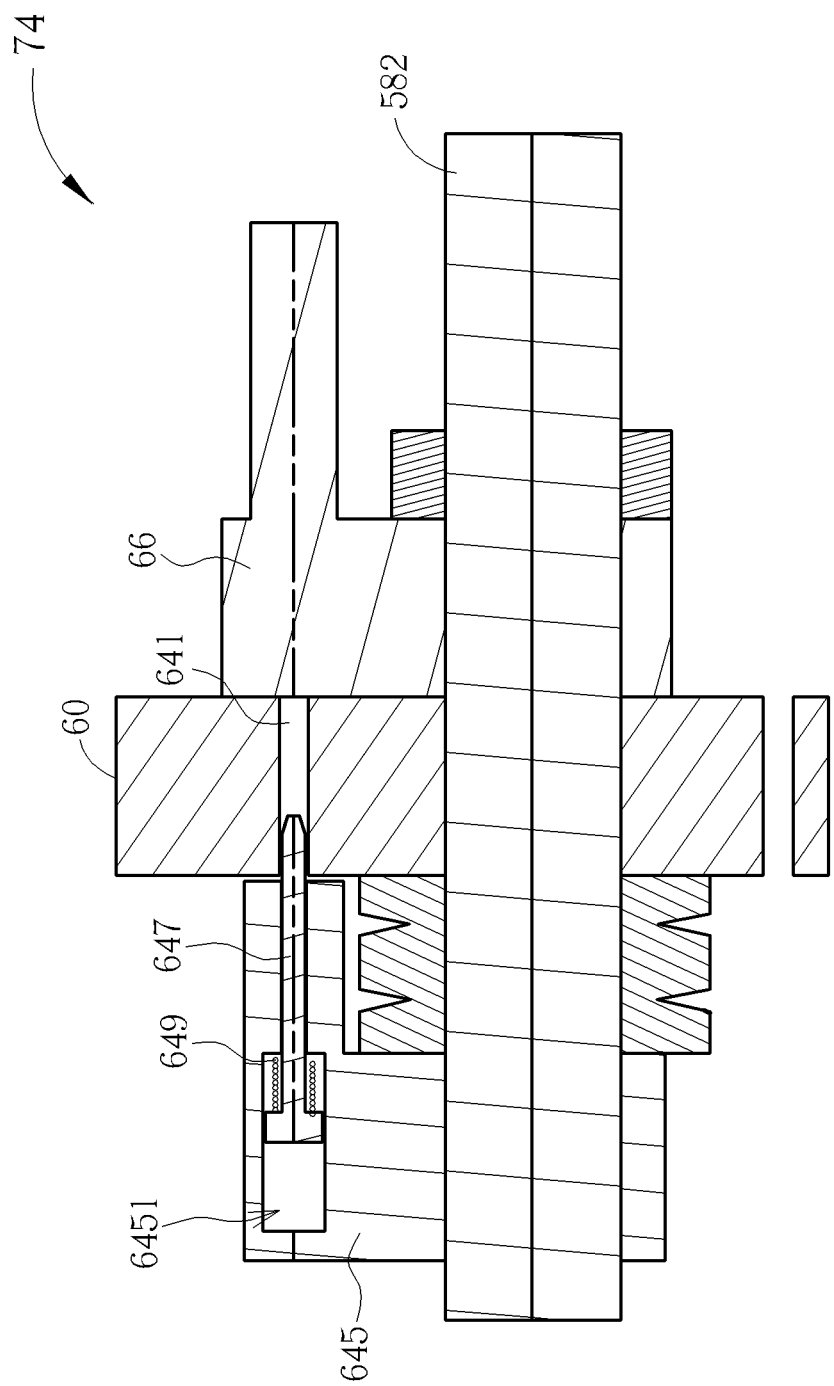

Referring to FIGS. 2 and 12-15, FIG. 12 is an exploded view illustrating an electromagnetic fixing mechanism 74 according to another embodiment of the invention, FIG. 13 is an assembly view illustrating the electromagnetic fixing mechanism 74 according to another embodiment of the invention, and FIGS. 14 and 15 are cross-sectional views illustrating different parts of the electromagnetic fixing mechanism 74 according to another embodiment of the invention. The difference between this embodiment and the aforesaid embodiment is that the locating module 262 is implemented by different manner. The configuration of the fixing module 164 is the same as that of the aforesaid embodiment. In this embodiment, the locating module 262 comprises a base 76, a plurality of engaging portions 78, an engaging component 80 and two resilient components 82. The base 76 is connected to the mounted portion 581 of the mounted component 58. The engaging portions 78 are formed on the rotating component 60 and may be implemented by a gear structure. The engaging component 80 is installed in the base 76 and used for engaging with one of the engaging portions 78 such that the rotating component 60 is located on at least one fixing position. The two resilient components 82 are connected to opposite sides of the engaging component 80 and used for driving the engaging component 80 to move to an initial position while the engaging component 80 is disengaged from one of the engaging portions 78. In this embodiment, the numbers of the engaging portions 78 and fixing holes 641 are identical.

Referring to FIG. 14, when the rotating component 60 is rotating in a rotating direction R due to an external force, a front end of the engaging component 80 will be pushed downward by a side wall of the corresponding engaging portion 78. At this time, the engaging component 80 will stretch the upper resilient component 82 and compress the lower resilient component 82, and the front end of the engaging component 80 will be disengaged from the corresponding engaging portion 78. Then, the engaging component 80 will move back to the initial position due to elastic recovery forces generated by the upper and lower resilient components 82, and the engaging component 80 will be engaged with another engaging portion 78 such that the rotating component 60 is located on another fixing position. Referring to FIGS. 2 and 15, as mentioned in the aforesaid embodiment, when the user performs touch operation on the touch display module 54, the control unit 68 will detect that the user activates the touch display module 54 and then transmit signals to the electromagnetic component 66, so as to trigger the electromagnetic component 66 to generate the magnetic attraction force. At this time, the fixing pillar 647 is attracted by the magnetic attraction force and then moves toward the electromagnetic component 66. Accordingly, the fixing pillar 647 is inserted into the fixing hole 641 of the rotating component 60 such that the rotating component 60 is restrained by the fixing pillar 647 and located on the fixing position. When the finger of the user gets away from the touch display module 54, the control unit 68 will stop transmitting signals to the electromagnetic component 66 such that the electromagnetic component 66 cannot provide the magnetic attraction force for the fixing pillar 647 anymore. Consequently, the fixing pillar 647 is pushed by the elastic recovery force of the recovery component 649 and then moves back to an initial position before being attracted by the magnetic attraction force. Then, the touch display module 54 can pivot relative to the host module 52. As mentioned in the aforesaid embodiment, the invention may be also implemented in the following manner. When the control unit 68 detects that the user activates the touch display module 54, the control unit 68 stops transmitting signals to the electromagnetic component 66 so as to trigger the electromagnetic component 66 to generate the magnetic attraction force; and when the finger of the user gets away from the touch display module 54, the control unit 68 transmits signals to the electromagnetic component 66 such that the electromagnetic component 66 stops providing the magnetic attraction force for the fixing pillar 647. The operation principle is the same as the aforesaid embodiment and will not be depicted herein again.

Compared with the prior art, the electromagnetic fixing mechanism of the invention utilizes the locating module to locate the rotating component, which is connected to the touch display module, on the desired fixing position and utilizes the control unit to control the electromagnetic component to provide the magnetic attraction force to attract the fixing module while the touch display module is activated, such that the fixing module fixes the rotating module, so as to prevent the touch display module from pivoting relative to the host module. Accordingly, compared with the prior art, when a user performs touch operation on the touch display module of the invention, the touch display module will not pivot and shake relative to the host module such that the user will feel more comfortable than the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electromagnetic fixing mechanism for preventing a touch display module of an electronic device from pivoting relative to a host module of the electronic device, comprising:
 a mounted component connected to the host module;
 a rotating component pivotally connected to the mounted component and connected to the touch display module such that the touch display module is capable of pivoting relative to the host module;
 a locating module for locating the rotating component on one of a plurality of fixing positions while the rotating component pivots relative to the mounted component, such that an angle included between the touch display module and the host module is capable of being adjusted by the locating module, wherein the locating module comprises:
  a plurality of recesses formed on a side of the locating module;
  a plurality of locating grooves formed on the rotating component and corresponding to the recesses;
  a plurality of sleeves installed in the locating grooves, respectively;
  a plurality of balls, each of the balls being disposed at an end of one of the sleeves; and
  a plurality of resilient components installed in the sleeves and used for pushing the balls such that the balls are engaged with the recesses and the rotating component is located on the at least one fixing position;
 a fixing module installed on an end of the mounted component and used for fixing the rotating component while the rotating component is located on the at least one fixing position;
 an electromagnetic component installed on the mounted component and used for providing a magnetic attraction force to attract the fixing module such that the fixing module fixes the rotating component; and
 a control unit electrically connected to the touch display module and the electromagnetic component, the control unit being used for controlling the electromagnetic component to provide the magnetic attraction force to attract the fixing module while a touch operation is performed on the touch display module.

2. The electromagnetic fixing mechanism of claim 1, wherein the fixing module comprises:
   a plurality of fixing holes formed on the rotating component and corresponding to the locating grooves;
   a fixing portion fixed on an axle portion of the mounted component, the recesses being formed on a side of the fixing portion and facing the balls, an insertion hole being formed on the fixing portion;
   a fixing cover sleeved and fixed on the axle portion of the mounted component, a pillar-shaped recess being formed on the fixing cover and corresponding to the insertion hole;
   a fixing pillar movably installed in the pillar-shaped recess of the fixing cover, the fixing pillar being driven by the magnetic attraction force provided by the electromagnetic component to pass through the insertion hole and be inserted into one of the fixing holes, so as to prevent the rotating component from pivoting relative to the mounted component; and
   a recovery component installed in the pillar-shaped recess of the fixing cover and sleeved on the fixing pillar, the recovery component being used for driving the fixing pillar to move into the pillar-shaped recess while the fixing pillar has not been driven by the magnetic attraction force provided by the electromagnetic component yet.

3. The electromagnetic fixing mechanism of claim 2, wherein the numbers of the fixing holes, locating grooves, recesses, sleeves, balls and resilient components are identical.

4. An electronic device comprising:
   a host module;
   a touch display module pivotally connected to the host module; and
   an electromagnetic fixing mechanism for preventing the touch display module from pivoting relative to the host module, comprising:
      a mounted component connected to the host module;
      a rotating component pivotally connected to the mounted component and connected to the touch display module such that the touch display module is capable of pivoting relative to the host module;
      a locating module for locating the rotating component on one of a plurality of fixing positions while the rotating component pivots relative to the mounted component, such that an angle included between the touch display module and the host module is capable of being adjusted by the locating module, wherein the locating module comprises:
         a plurality of recesses formed on a side of the locating module;
         a plurality of locating grooves formed on the rotating component and corresponding to the recesses;
         a plurality of sleeves installed in the locating grooves, respectively;
         a plurality of balls, each of the balls being disposed at an end of one of the sleeves; and
         a plurality of resilient components installed in the sleeves and used for pushing the balls such that the balls are engaged with the recesses and the rotating component is located on the at least one fixing position;
      a fixing module installed on an end of the mounted component and used for fixing the rotating component while the rotating component is located on the at least one fixing position;
      an electromagnetic component installed on the mounted component and used for providing a magnetic attraction force to attract the fixing module such that the fixing module fixes the rotating component; and
      a control unit electrically connected to the touch display module and the electromagnetic component, the control unit being used for controlling the electromagnetic component to provide the magnetic attraction force to attract the fixing module while a touch operation is performed on the touch display module.

5. The electronic device of claim 4, wherein the fixing module comprises:
   a plurality of fixing holes formed on the rotating component and corresponding to the locating grooves;
   a fixing portion fixed on an axle portion of the mounted component, the recesses being formed on a side of the fixing portion and facing the balls, an insertion hole being formed on the fixing portion;
   a fixing cover sleeved and fixed on the axle portion of the mounted component, a pillar-shaped recess being formed on the fixing cover and corresponding to the insertion hole;
   a fixing pillar movably installed in the pillar-shaped recess of the fixing cover, the fixing pillar being driven by the magnetic attraction force provided by the electromagnetic component to pass through the insertion hole and be inserted into one of the fixing holes, so as to prevent the rotating component from pivoting relative to the mounted component; and
   a recovery component installed in the pillar-shaped recess of the fixing cover and sleeved on the fixing pillar, the recovery component being used for driving the fixing pillar to move into the pillar-shaped recess while the fixing pillar has not been driven by the magnetic attraction force provided by the electromagnetic component yet.

6. The electronic device of claim 5, wherein the numbers of the fixing holes, locating grooves, recesses, sleeves, balls and resilient components are identical.

7. An electromagnetic fixing mechanism for preventing a touch display module of an electronic device from pivoting relative to a host module of the electronic device, comprising:
   a mounted component connected to the host module;
   a rotating component pivotally connected to the mounted component and connected to the touch display module such that the touch display module is capable of pivoting relative to the host module;
   a locating module for locating the rotating component on one of a plurality of fixing positions while the rotating component pivots relative to the mounted component, such that an angle included between the touch display module and the host module is capable of being adjusted by the locating module;
   a fixing module installed on an end of the mounted component and used for fixing the rotating component while the rotating component is located on the at least one fixing position, wherein the fixing module comprises:
      a plurality of fixing holes formed on the rotating component;
      a fixing portion fixed on an axle portion of the mounted component, an insertion hole being formed on the fixing portion;
      a fixing cover sleeved and fixed on the axle portion of the mounted component, a pillar-shaped recess being formed on the fixing cover and corresponding to the insertion hole;
      a fixing pillar movably installed in the pillar-shaped recess of the fixing cover, the fixing pillar being driven by the magnetic attraction force provided by the electromagnetic component to pass through the insertion hole and be inserted into one of the fixing holes, so as to prevent the rotating component from pivoting relative to the mounted component; and a recovery component installed in the pillar-shaped recess of the fixing cover and sleeved on the fixing pillar, the recovery component being used for driving the fixing pillar to move into the pillar-shaped recess while the fixing pillar has not been driven by the magnetic attraction force provided by the electromagnetic component yet;

an electromagnetic component installed on the mounted component and used for providing a magnetic attraction force to attract the fixing module such that the fixing module fixes the rotating component; and a control unit electrically connected to the touch display module and the electromagnetic component, the control unit being used for controlling the electromagnetic component to provide the magnetic attraction force to attract the fixing module while a touch operation is performed on the touch display module.

8. The electromagnetic fixing mechanism of claim 7, wherein the locating module comprises:

a plurality of recesses formed on a side of the fixing portion;

a plurality of locating grooves formed on the rotating component and corresponding to the recesses;

a plurality of sleeves installed in the locating grooves, respectively;

a plurality of balls, each of the balls being disposed at an end of one of the sleeves; and a plurality of resilient components installed in the sleeves and used for pushing the balls such that the balls are engaged with the recesses and the rotating component is located on the at least one fixing position.

* * * * *